(12) United States Patent
Kim et al.

(10) Patent No.: US 12,019,641 B2
(45) Date of Patent: *Jun. 25, 2024

(54) TASK AGNOSTIC OPEN-SET PROTOTYPES FOR FEW-SHOT OPEN-SET RECOGNITION

(71) Applicant: QUALCOMM Incorporated, San Diego, CA (US)

(72) Inventors: Byeonggeun Kim, Seoul (KR); Juntae Lee, Seoul (KR); Simyung Chang, Suwon (KR)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,899

(22) Filed: Jan. 12, 2023

(65) Prior Publication Data
US 2024/0004889 A1    Jan. 4, 2024

Related U.S. Application Data

(60) Provisional application No. 63/343,478, filed on May 18, 2022.

(51) Int. Cl.
*G06F 7/00* (2006.01)
*G06F 16/2458* (2019.01)
*G06F 16/28* (2019.01)

(52) U.S. Cl.
CPC ........ *G06F 16/2462* (2019.01); *G06F 16/285* (2019.01)

(58) Field of Classification Search
CPC ............. G06F 16/2462; G06F 16/285; G06F 16/2264; G06F 16/2237; G06F 16/35;
(Continued)

(56) References Cited

U.S. PATENT DOCUMENTS 10,963,754 B1 * 3/2021 Ravichandran ...... G06V 10/764
2008/0021899 A1 * 1/2008 Avidan .............. G06F 18/24147
(Continued)

OTHER PUBLICATIONS

Huang S., et al., "Task-Adaptive Negative Class Envision for Few-shot Open-Set Recognition", Arxiv.Org, Cornell University Library, 201 Olin Library Cornell University Ithaca, NY 14853, Dec. 24, 2020, XP081845886, pp. 1-10, Abstract Figures 1, 2, Sections (3, 4, 4.2, 4.3, 5.2).
(Continued)

*Primary Examiner* — Mohammad A Sana
(74) *Attorney, Agent, or Firm* — Polsinelli LLP

(57) ABSTRACT

Systems and techniques are provided for processing one or more data samples. For example, a neural network classifier can be trained to perform few-shot open-set recognition (FSOSR) based on a task-agnostic open-set prototype. A process can include determining one or more prototype representations for each class included in a plurality of support samples. A task-agnostic open-set prototype representation can be determined, in a same learned metric space as the one or more prototype representations. One or more distance metrics can be determined for each query sample of one or more query samples, based on the one or more prototype representations and the task-agnostic open-set prototype representation. Based on the one or more distance metrics, each query sample can be classified into one of classes associated with the one or more prototype representations or an open-set class associated with the task-agnostic open-set prototype representation.

30 Claims, 8 Drawing Sheets

(58) Field of Classification Search
CPC ........... G06F 18/2148; G06F 18/24147; G06F 18/24133; G06F 18/22; G06F 18/217; G06F 18/40
See application file for complete search history.

(56) References Cited

U.S. PATENT DOCUMENTS

| | | | | |
|---|---|---|---|---|
| 2019/0087685 A1* | 3/2019 | Wu | ........................ | G06N 20/00 |
| 2019/0108398 A1* | 4/2019 | Haghighat | ............ | G06V 40/161 |
| 2023/0298572 A1* | 9/2023 | Kim | ........................ | G06F 18/22 |
| | | | | 704/232 |

OTHER PUBLICATIONS

International Search Report and Written Opinion—PCT/US2023/064965—ISA/EPO—Jun. 15, 2023.
Parnami A., et al., "Few-Shot Keyword Spotting with Prototypical Networks", Arxiv.Org, Cornell University Library, 201 Olin Library Cornell University Ithaca, NY 14853, Jul. 25, 2020, 6 Pages, XP091244533, Abstract, Sections 3, 4, Figure 1.
Parnami A., et al., "Learning from Few Examples: A Summary of Approaches to Few-Shot Learning", Arxiv.Org, Cornell University Library, 201 Olin Library Cornell University Ithaca, NY 14853, Mar. 7, 2022, XP091179121, pp. 1-32.

* cited by examiner

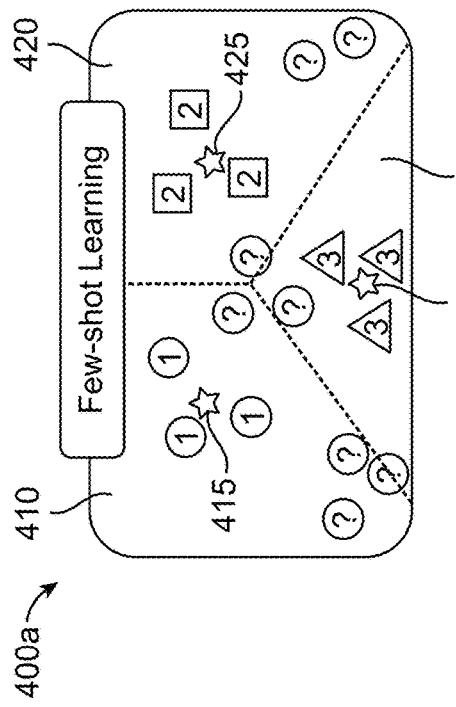
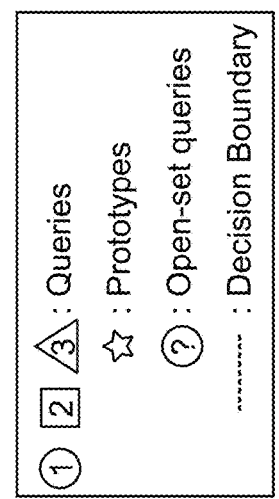
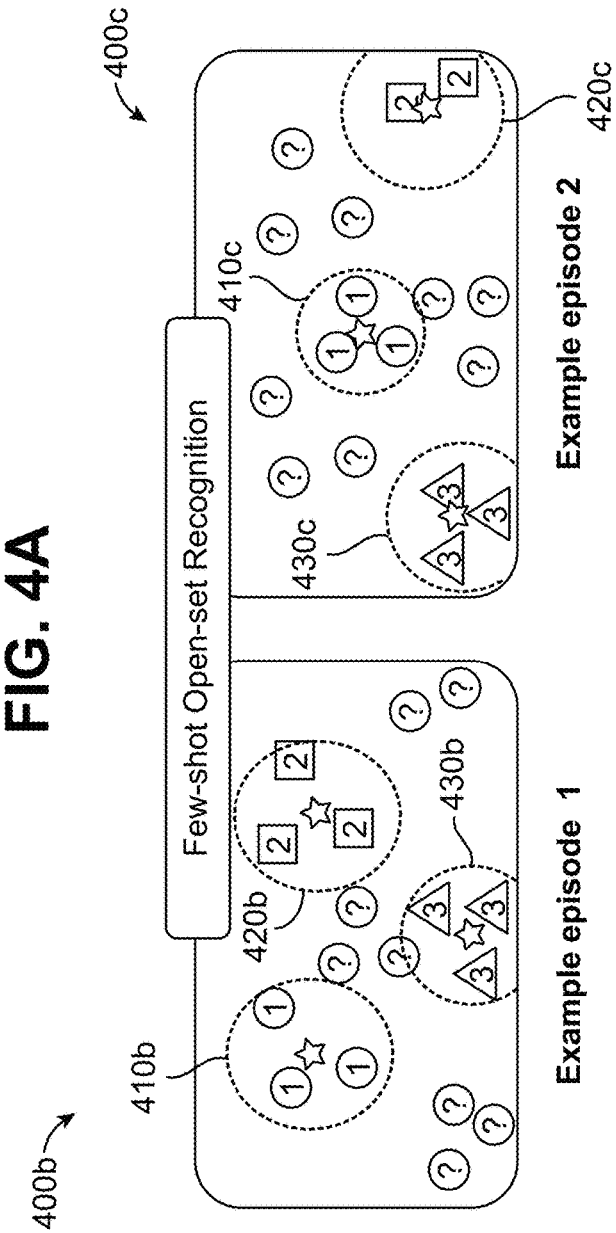
FIG. 4A
FIG. 4B
FIG. 4C

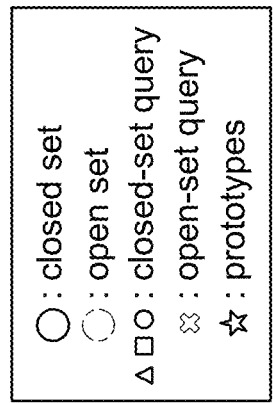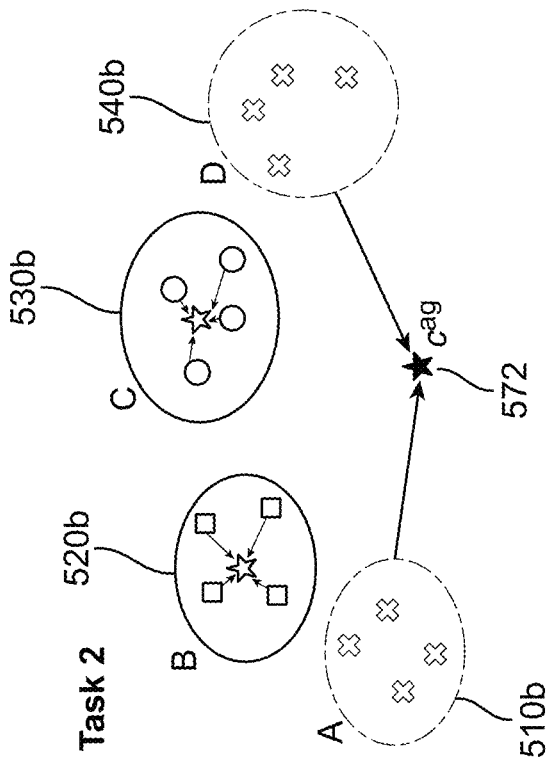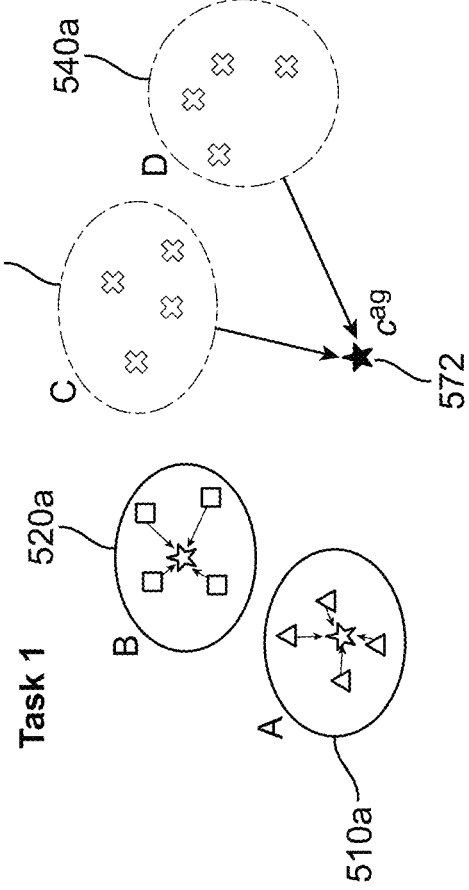
FIG. 5A
FIG. 5B

TASK AGNOSTIC OPEN-SET PROTOTYPES FOR FEW-SHOT OPEN-SET RECOGNITION

CROSS-REFERENCE TO RELATED APPLICATIONS

This application claims the benefit of U.S. Provisional Application No. 63/343,478, filed May 18, 2022, which is hereby incorporated by reference, in its entirety and for all purposes.

FIELD

The present disclosure generally relates to machine learning classification. For example, aspects of the present disclosure are related to systems and techniques for performing few-shot open-set recognition (FSOSR) using one or more machine learning systems (e.g., including one or more neural network-based models).

BACKGROUND

An artificial neural network attempts to replicate, using computer technology, logical reasoning performed by the biological neural networks that constitute animal brains. Deep neural networks, such as convolutional neural networks, are widely used for numerous applications, such as object detection, object classification, object tracking, big data analysis, among others. For example, convolutional neural networks are able to extract high-level features, such as facial shapes, from an input image, and use these high-level features to output a probability that, for example, an input image includes a particular object.

SUMMARY

In some examples, systems and techniques are described for few-shot open-set recognition (FSOSR) using a task-agnostic open-set prototype. According to at least one example, a method (e.g., a processor-implemented method) is provided for processing one or more data samples. The method includes: determining one or more prototype representations based on a plurality of support samples associated with one or more classes of data samples, wherein each prototype representation is associated with one of the one or more classes; determining a task-agnostic open-set prototype representation, wherein the one or more prototype representations and the task-agnostic open-set prototype representation are determined in a same learned metric space; determining one or more distance metrics for each query sample of one or more query samples, wherein the one or more distance metrics are determined based on the one or more prototype representations and the task-agnostic open-set prototype representation; and classifying each query sample based on the one or more distance metrics, wherein each query sample is classified into one of the one or more classes associated with the one or more prototype representations or an open-set class associated with the task-agnostic open-set prototype representation.

In another example, an apparatus for processing one or more data samples is provided that includes a memory (e.g., configured to store data) and one or more processors (e.g., implemented in circuitry) coupled to the memory. The one or more processors are configured to and can: determine one or more prototype representations based on a plurality of support samples associated with one or more classes of data samples, wherein each prototype representation is associated with one of the one or more classes; determine a task-agnostic open-set prototype representation, wherein the one or more prototype representations and the task-agnostic open-set prototype representation are determined in a same learned metric space; determine one or more distance metrics for each query sample of one or more query samples, wherein the one or more distance metrics are determined based on the one or more prototype representations and the task-agnostic open-set prototype representation; and classify each query sample based on the one or more distance metrics, wherein each query sample is classified into one of the one or more classes associated with the one or more prototype representations or an open-set class associated with the task-agnostic open-set prototype representation.

In another example, a non-transitory computer-readable medium is provided that has stored thereon instructions that, when executed by one or more processors, cause the one or more processors to: determine one or more prototype representations based on a plurality of support samples associated with one or more classes of data samples, wherein each prototype representation is associated with one of the one or more classes; determine a task-agnostic open-set prototype representation, wherein the one or more prototype representations and the task-agnostic open-set prototype representation are determined in a same learned metric space; determine one or more distance metrics for each query sample of one or more query samples, wherein the one or more distance metrics are determined based on the one or more prototype representations and the task-agnostic open-set prototype representation; and classify each query sample based on the one or more distance metrics, wherein each query sample is classified into one of the one or more classes associated with the one or more prototype representations or an open-set class associated with the task-agnostic open-set prototype representation.

In another example, an apparatus for processing one or more data samples is provided. The apparatus includes: means for determining one or more prototype representations based on a plurality of support samples associated with one or more classes of data samples, wherein each prototype representation is associated with one of the one or more classes; means for determining a task-agnostic open-set prototype representation, wherein the one or more prototype representations and the task-agnostic open-set prototype representation are determined in a same learned metric space; means for determining one or more distance metrics for each query sample of one or more query samples, wherein the one or more distance metrics are determined based on the one or more prototype representations and the task-agnostic open-set prototype representation; and means for classifying each query sample based on the one or more distance metrics, wherein each query sample is classified into one of the one or more classes associated with the one or more prototype representations or an open-set class associated with the task-agnostic open-set prototype representation.

In some aspects, one or more of the apparatuses described herein is, is part of, and/or includes a mobile device (e.g., a mobile telephone or other mobile device), a wearable device, an extended reality (XR) device (e.g., a virtual reality (VR) device, an augmented reality (AR) device, or a mixed reality (MR) device), connected devices, a head-mounted device (HMD) device, a wireless communication device, a camera, a personal computer, a laptop computer, a server computer, a vehicle or a computing device or component of a vehicle, another device, or a combination thereof. An electronic device (e.g., a mobile phone, etc.) is configured with hardware components that enable the electronic device to perform or execute a particular context or application. In some aspects, the apparatus includes a camera or multiple cameras for capturing one or more images or video frames of a scene including various items, such as a person, animals and/or any object(s). In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor). In some cases, machine learning models (e.g., one or more neural networks or other machine learning models) may be used to process the sensor data and generate a classification related to the sensor data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other objects and advantages associated with the aspects disclosed herein, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof:

FIG. 4A is a diagram illustrating another example of a few-shot learning (FSL) scenario, in accordance with some examples;

FIG. 4B is a diagram illustrating a first example episode of a few-shot open-set recognition (FSOSR) episode, in accordance with some examples;

FIG. 4C is a diagram illustrating a second example episode of a few-shot open-set recognition (FSOSR) episode, in accordance with some examples;

FIG. 5A is a diagram illustrating an example task-agnostic open-set prototype associated with a first task having a first selection of open and closed sets, in accordance with some examples;

FIG. 5B is a diagram illustrating an example task-agnostic open-set prototype associated with a second task having a second selection of open and closed sets, in accordance with some examples;

DETAILED DESCRIPTION

Figure 1:
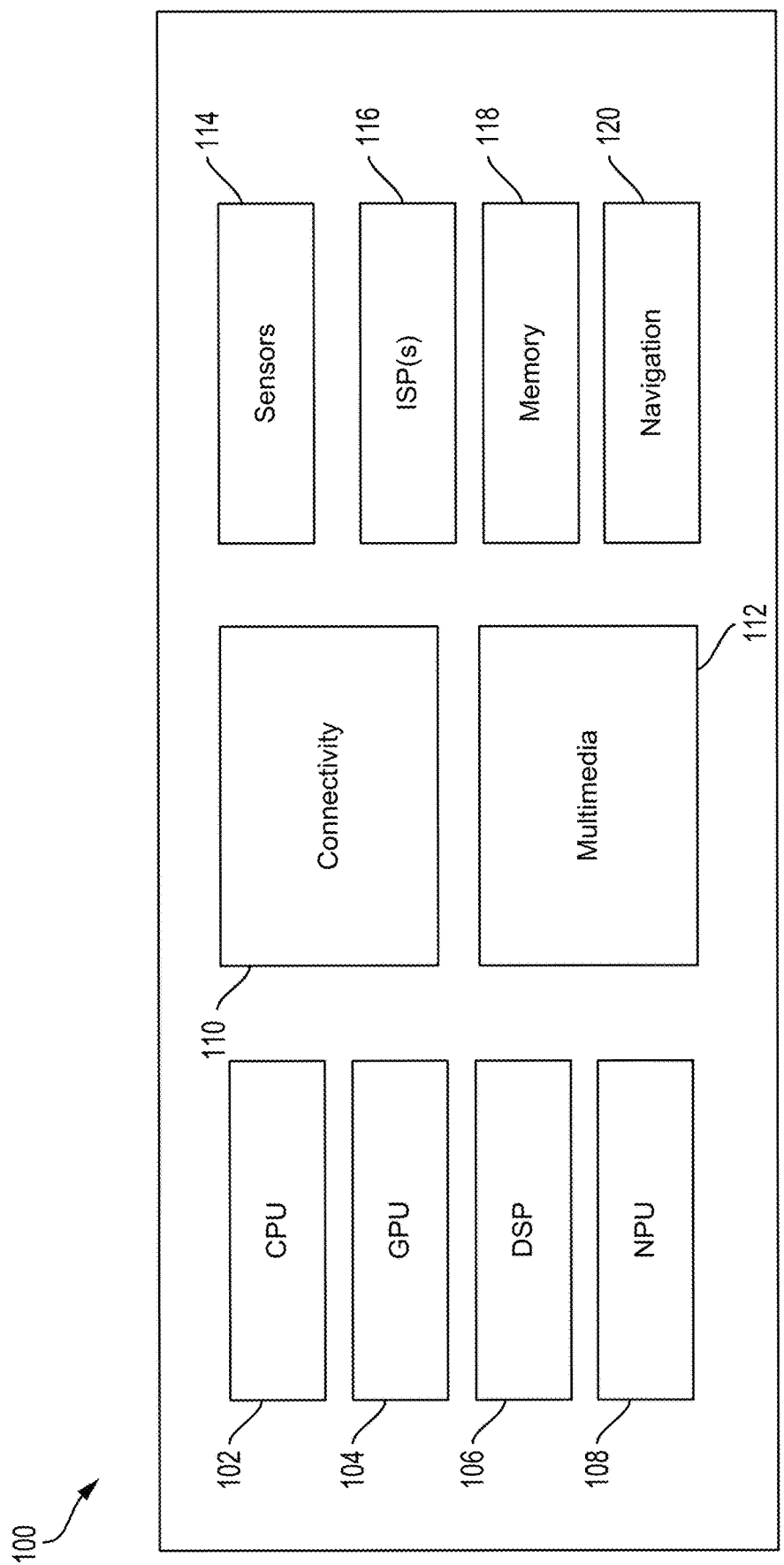
FIG. 1 illustrates an example implementation of a System-on-a-Chip (SoC), in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the application. However, it will be apparent that various aspects and examples may be practiced without these specific details. The figures and description are not intended to be restrictive.

The ensuing description provides example aspects, and is not intended to limit the scope, applicability, or configuration of the disclosure. Rather, the ensuing description of the exemplary aspects will provide those skilled in the art with an enabling description for implementing examples and aspects of the disclosure. It should be understood that various changes may be made in the function and arrangement of elements without departing from the spirit and scope of the application as set forth in the appended claims.

Deep learning can be used to perform tasks such as recognition and/or classification for various types of input data. For example, deep learning can be used to perform tasks such as image recognition, image classification, object classification, voice recognition, keyword spotting (KWS), among others. In some cases, different types of input data may also be referred to as "input domains" or "domains" (e.g., image data may be associated with an image domain, audio data may be associated with an audio domain, etc.).

Deep learning can be performed using one or more neural networks. For example, a neural network can be trained to perform a recognition or classification task based on one or more sets of training data that are provided as input to the neural network during a training process. The training data can be labeled, unlabeled, or a combination of the two. The training (e.g., learning) process can be supervised, unsupervised, or a combination of the two. While different neural network architectures, deep learning approaches, and training processes exist, the need for a large volume of training data may often be a common requirement.

For example, tens of thousands or hundreds of thousands of individual training data samples may be used to train a neural network to perform a recognition or classification task to a given level of accuracy. In some cases, compiling a representative training data set for a given machine learning task can be a challenging and time-consuming task. Additionally, training a neural network using a relatively large training data set can be a computationally intensive task that is also time-consuming. In some examples, the performance of various neural networks and/or machine learning networks may decrease when an available training data set is small or otherwise limited.

Many neural networks are trained with a reliance on learning from large-scale data and may be unable to rapidly generalize from a few examples that are outside of the seen training data. For example, an image classification neural network can be trained to classify the type(s) of plants present in an image, based on a large-scale training data set with thousands of training data pairs that each include an image of a plant and a ground-truth classification label. However, it may be unlikely that such an image classification network could subsequently be used to classify the type(s) of airplanes present in an image, given only a few labeled examples of airplane classifications (e.g., a neural network trained over a set of pre-defined data sample classifications can achieve accurate performance when evaluated against a closed set of classes that were seen in training, but is often limited to detecting only those classes that were seen in training).

Few-shot learning (FSL) is a machine learning approach that may be used to provide a neural network (e.g., a neural network classifier, etc.) with improved generalization to new tasks containing only a few samples with supervised information. For example, an FSL-based neural network classifier may attempt to correctly classify one or more classes that are previously unseen (e.g., unseen during training) but are known based on a set of labeled support samples (e.g., provided during inference). In some cases, FSL-based neural network classifiers can classify a given query (e.g., inference input) into one or more of a closed set of pre-defined classes that were seen in training, or into a previously unseen class that is identified during an FSL episode (e.g., based on the support samples).

For example, an FSL-based neural network classifier can be used to detect or classify data samples (e.g., images, audio data, video data, etc.) into one or more classes that were not originally seen during training. In an example FSL-based classification approach, a neural network classifier is trained on a training set that includes labeled samples representing various pre-defined classes or categories of the data samples. During training, the neural network classifier absorbs knowledge from the labeled samples of the training set. For example, the neural network classifier can learn embeddings or an embedding space for relating the training samples to their corresponding labels. The trained neural network classifier can subsequently adapt or generalize (e.g., at inference) to evaluation tasks of new classes not seen in the training set (e.g., unseen classes).

For example, given only a small number of support examples for each new class, the FSL-based neural network classifier can use an attention mechanism over a learned embedding of the labeled set of support examples (e.g., the support set) to predict classes for unlabeled points (e.g., a query set). In a process of query-by-example, a trained FSL-based neural network classifier can receive a support set that includes M support examples for each of N unseen classes, and a query set that includes one or more query samples. The neural network classifier can determine a prototype representation for each unseen class N (e.g., using the M support examples associated with each unseen class N). Each unlabeled query sample can be classified into one of the previously unseen classes N based on a computed distance between the query sample and each prototype representation. In some cases, this inference process can be referred to as an N-way M-shot episode, where the goal of the FSL-based neural network classifier is to correctly classify a query set into N classes that are unseen during training but known using the M support samples.

In real-world scenarios and/or data sets in which FSL-based neural network classifiers may be utilized, an input query (e.g., inference input) may naturally include data samples of unexpected novel classes whose support examples are not given. An unexpected novel class can be a class for which no support examples were included in the initial training set or the support set. These unexpected samples and/or classes can be referred to as an "open-set" (e.g., in contrast to the closed set of classes from the initial training set and the support set).

In some cases, FSL-based neural network classifiers may exhibit over-confidence and incorrectly classify an unseen open-set example into one of the FSL classes. In some approaches to FSL, an FSL-based neural network classifier may classify every input query into one of the known (e.g., closed set) classes, even if an input query belongs to an unknown (e.g., open set) class. In such an approach, each input query is treated as a closed set example and the classification does not extend to the possibility of an input query being an open set example. In some examples, the accuracy and/or performance of an FSL-based neural network classifier can be improved by rejecting open-set examples rather than classifying them into one of the pre-determined closed set classifications (e.g., of the closed set). For example, Open-Set Recognition (OSR) can be used to detect unseen open-set classes and subsequently handle and/or reject query samples belonging to the detected open-set class.

OSR can be used to distinguish unknown novel categories (e.g., classes) from a fixed closed set. For example, an input query that is not classified into a closed set class (e.g., because the input query is not sufficiently close to any of the closed set classes) can be classified into an open-set class and/or can be classified as an open-set example. OSR can be performed with FSL, in what may also be referred to as few-shot open-set recognition (FSOSR). FSOSR can be used to extend FSL-based classification approaches by also attempting to correctly classify open-set examples into an open-set class (e.g., in addition to classifying closed-set examples into a closed-set class).

In FSOSR-based approaches, for few-shot tasks (e.g., few-shot classification tasks), a neural network can be trained to correctly recognize closed set examples whose classes are described by a few labeled support samples, while also rejecting open-set samples with no class cue. In some cases, open-set recognition may be more challenging in an FSOSR-based approach than in a conventional OSR-based approach, for example based at least in part on the relatively small number of support examples utilized in each FSL episode and/or the varying closed and open sets over multiple FSL episodes. For example, a closed-set class in one FSL episode may be selected as an open-set class in a different FSL episode and vice versa, as will be described in greater depth below. As such, there is a need for improved FSOSR performance that can correctly dichotomize closed and open set examples while maintaining classification capability for the closed set examples, and moreover, that can do so in a task-agnostic manner.

Systems, apparatus, processes (also referred to as methods), and computer-readable media (collectively referred to as "systems and techniques") are described herein for performing few-shot open-set recognition (FSOSR) using a machine learning classifier, based on a learned task-agnostic open-set prototype class. In some examples, the machine learning classifier can be a neural network classifier. The few-shot neural network classifier can be used to perform improved classification tasks over various data samples (e.g., in various data domains) with OSR by determining (e.g., learning) a task-agnostic (e.g., episode-agnostic) open-set prototype representation that can be used to classify and/or reject open-set query samples as belonging to an open-set class. In some examples, the FSOSR task-agnostic open-set prototype-based classifier can classify the predicted task-agnostic open-set classes as an open-set that is to be rejected from a downstream or subsequent classification, detection, or other machine learning process, etc.

In some examples, the systems and techniques can generate a task-agnostic open-set prototype to which every query sample is mapped if the query sample's true class (e.g., ground-truth class) is unavailable (e.g., because the query sample is included in a given FSOSR episode as an open-set sample). In some aspects, the task-agnostic open-set prototype can be generated (e.g., learned) such that the task-agnostic open-set prototype is a global-second-best class for any given query sample, across multiple different FSOSR tasks or episodes. Based on this learned task-agnostic open-set prototype as a global second-best classification, open-set samples can be accurately classified into the task-agnostic open-set class in all tasks. In some examples, one or more scalar-valued scaling factors can be learned alongside the task-agnostic open-set prototype. The scaling factors may also be task-agnostic. In some cases, the learned scaling factors can be learned to refine and enforce the task-agnostic open-set prototype described herein as a global second-best classification across multiple classification tasks, for both open-set and closed-set query examples, as will be described in greater depth below.

An illustrative example of a neural network for generating a task-agnostic open-set prototype for few-shot open-set recognition (FSOSR) is described in Appendix A appended hereto.

Various aspects of the present disclosure will be described with respect to the figures. FIG. 1 illustrates an example implementation of a system-on-a-chip (SoC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures, speech, and/or other interactive user action(s) or input(s). In one implementation, the NPU is implemented in the CPU 102, DSP 106, and/or GPU 104. The SoC 100 may also include a sensor processor 114, image signal processors (ISPs) 116, and/or navigation module 120, which may include a global positioning system. In some examples, the sensor processor 114 can be associated with or connected to one or more sensors for providing sensor input(s) to sensor processor 114. For example, the one or more sensors and the sensor processor 114 can be provided in, coupled to, or otherwise associated with a same computing device.

In some examples, the one or more sensors can include one or more microphones for receiving sound (e.g., an audio input), including sound or audio inputs that can be used to perform tasks such as keyword spotting (KWS), among others. In some cases, the sound or audio input received by the one or more microphones (and/or other sensors) may be digitized into data packets for analysis and/or transmission. The audio input may include ambient sounds in the vicinity of a computing device associated with the SoC 100 and/or may include speech from a user of the computing device associated with the SoC 100. In some cases, a computing device associated with the SoC 100 can additionally, or alternatively, be communicatively coupled to one or more peripheral devices (not shown) and/or configured to communicate with one or more remote computing devices or external resources, for example using a wireless transceiver and a communication network, such as a cellular communication network.

The SoC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SoC 100 and/or components thereof may be configured to perform audio signal processing using one or more machine learning networks and/or machine learning techniques according to aspects of the present disclosure and as described herein. For example, SoC 100 and/or components thereof may be configured to perform keyword spotting according to aspects of the present disclosure. In some examples, by using one or more neural network classifiers to perform few-shot learning (FSL) and/or open-set recognition (OSR), aspects of the present disclosure can increase the accuracy and/or efficiency of keyword spotting (KWS).

Machine learning (ML) can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as speech analysis, audio signal analysis, image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases. Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
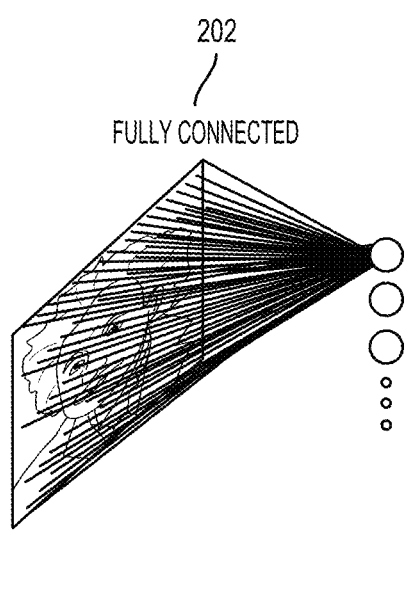
FIG. 2A and FIG. 2B illustrate an example of a fully connected neural network, in accordance with some examples.
Figure 2B:
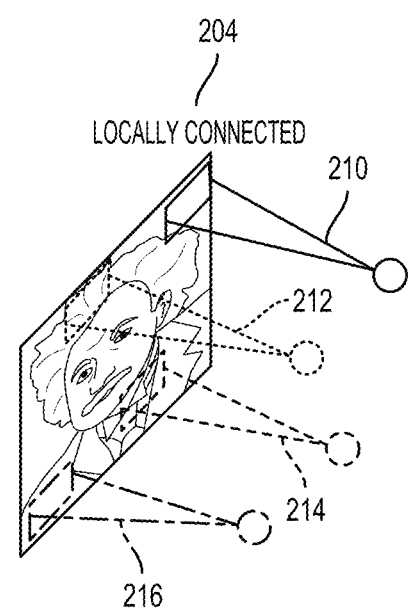

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, as the higher layer neurons in a given region may receive inputs that are tuned through training to the properties of a restricted portion of the total input to the network.

Figure 3:
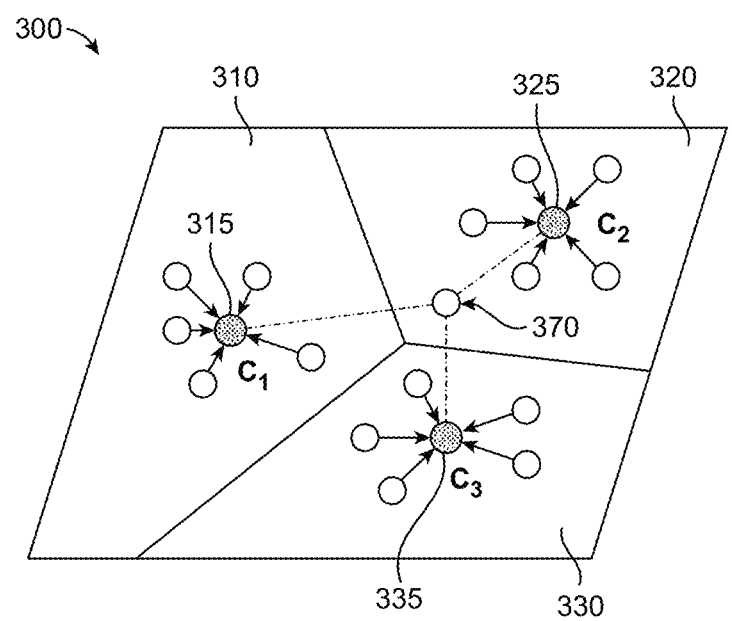
FIG. 3 is a diagram illustrating an example of a few-shot learning (FSL) scenario, in accordance with some examples.

FIG. 3 is a diagram illustrating an example of a few-shot learning (FSL) scenario 300. In some examples, FSL and/or FSL-based approaches can be used to perform few-shot classification, wherein a classifier (e.g., a neural network or other machine learning classifier) can generalize and extend inference to include new classes not seen in a training set, given only a small number of examples of each new class. For example, FSL-based neural network classifiers can be trained to correctly classify unseen test categories based on a relatively low number of support examples that are provided at the time of inference, as will be described in greater depth below.

As illustrated, FIG. 3 depicts an example of a 3-way 5-shot FSL scenario, in which a neural network classifier (not shown) receives as input a support set that includes a total of 15 labeled support examples, divided into three previously unseen classes (e.g., a first class 310, a second class 320, and a third class 330) having five support examples each. In one illustrative example, the 3-way 5-shot FSL scenario 300 can be associated with a prototypical network, which learns a metric space in which classification can be performed by computing distances to prototype representations of each class.

The use of prototypical networks for FSL can be based on the idea that there exists an embedding in which points cluster around a single prototype representation for each class. As illustrated in FIG. 3, the five support examples included in class 310 can be seen to cluster around prototype representation 315; the five support examples included in class 320 can be seen to cluster around prototype representation 325; the five support examples included in class 330 can be seen to cluster around prototype representation 335; etc. A prototypical network can include one or more neural networks that learn (e.g., during training) a non-linear mapping of the input into an embedding space. Using the learned embedding space, the prototypical network can take each previously unseen class's prototype to be the mean of its support set in the embedding space. For example, the prototype representation 315 can be determined as the mean of the five embedded support examples for class 310; the prototype representation 325 can be determined as the mean of the five embedded support examples for class 320; the prototype representation 335 can be determined as the mean for the five embedded support examples for class 330; etc.

Classification can then be performed for an embedded query point by determining the nearest class prototype to the query point. For example, the embedded query point 370 can be classified into class 320 based on a determination that the distance from embedded query point 370 to prototype representation 325 is smaller than the distance from embedded query point 370 to either of the remaining prototype representations 315 and 335. In some examples, embedded query points (e.g., embedded query point 370) can be classified based on the Euclidean distance between the embedded query point and each of the prototype representations, although it is noted that various other distance metrics and/or determinations may also be utilized without departing from the scope of the present disclosure.

FIG. 4A is a diagram illustrating another example of an FSL scenario 400a. In some examples, FSL scenario 400a can be associated with one or more prototypical networks (e.g., such as the prototypical network(s) described above with respect to FIG. 3). As mentioned previously, in an N-way M-shot FSL episode (e.g., one round of inference for a support set containing N*M support examples), FSL can be performed with a goal of correctly classifying one or more queries of a query set into N classes that are unseen during training but known on the basis of receiving M support samples for each previously unseen class. In some examples, a pure FSL-based approach does not consider open-set classes out of the N classes, meaning that a pure FSL-based approach such as that of FSL scenario 400a will only classify the queries into one of the N closed-set classes.

In one illustrative example, FSL scenario 400a is a 3-way 5-shot FSL scenario, meaning that classification is performed over the three classes 410, 420 and 430 in an evaluation (e.g., inference) setting and that the respective prototype representations 415, 425 and 435 are generated using five embedded support examples for each of the three classes. In the context of FSL-based image classification, the three classes 410, 420 and 430 can each represent an image classification (e.g., landscape, selfie, indoors, etc.) and/or an object classification (e.g., person A, dog, face, etc.). For example, class 410 can represent the image classification 'landscape,' class 420 can represent the image classification 'selfie,' and class 430 can represent the image classification 'indoors.' Because FSL scenario 400a is a 3-way 5-shot FSL scenario, the support set S (not shown) can include a total of 15 support examples (e.g., five example landscape images labeled with the 'landscape' classification 410, five example selfie images labeled with the 'selfie' classification 420, and five example indoors images labeled with the 'indoors' classification 430).

As illustrated in FIG. 4A, a query set Q can include a combination of closed-set queries and open-set queries. Closed-set queries can include test samples from a known class (e.g., test images of landscapes, selfies, or indoors, corresponding to the support set classes 410, 420, 430, respectively). As illustrated in FIG. 4A, the query set includes three closed-set test samples for each class 410, 420, 430. Open-set queries can represent test samples from an unknown class and are depicted as open circles containing a '?' inside. For example, the open-set queries can include test samples that do not belong to either the landscape, selfie, or indoors classifications (e.g., the open-set queries can include test images of boats, sporting events, cityscapes, etc.). In some aspects, it is noted that the open-set queries/test samples can take various other forms with varying degrees of similarity to the closed-set test samples (e.g., because the open-set can be defined as including any test sample that does not match a known class). The test samples of the open-set queries can be associated with one or more unseen and unsupported classes that were not seen in either an initial training data set (e.g., used to initially train a neural network classifier associated with FSL scenario 400a) or in the support set S (e.g., provided to the neural network classifier at inference and used to perform FSL).

Because the open-set classes are unseen, unknown, or otherwise unsupported by the neural network classifier associated with FSL scenario 400a, each of the open-set queries will be incorrectly classified into one of the three known (e.g., closed-set) classes 410, 420, 430. For example, the decision boundaries depicted in FIG. 4A as dotted lines partitioning the embedding space can represent the (erroneous) closed-set classifications that may be determined for the open-set queries. In some examples, the erroneous classification of queries from open-set classes can occur due the design of existing FSL approaches (e.g., such as FSL scenario 400a), which are limited to only the known, closed-set classes and cannot consider any open-set classes regardless of the distance between an open-set query and the nearest prototype representation determined for one of the closed-set classes.

In some real-world scenarios, unseen and unsupported open-set classes may be regularly encountered and are consistently misjudged by existing FSL approaches as belonging to a known class from the closed-set of FSL classes that were seen in training or included in the support set S. There is a need to handle or reject any unseen and unsupported classes during FSL-based classification, such that novel open-set classes are not incorrectly classified into a seen closed-set class.

FIG. 4B illustrates a first example episode 400b of a few-shot open-set recognition (FSOSR) approach according to one or more aspects of the present disclosure. FIG. 4C illustrates a second example episode 400c of an FSOSR approach according to one or more aspects of the present disclosure. In one illustrative example, the first FSOSR episode 400b and the second FSOSR episode 400c can represent or be applied to the same underlying sample set S and query set Q as was described above with respect to the example FSL scenario 400a illustrated in FIG. 4A.

The systems and techniques described herein can perform FSOSR to distinguish an unknown open-set from the known closed-set classes, while still performing FSL to correctly classify closed-set samples into one of the known closed-set classes. For example, the systems and techniques can receive as input a query set including a combination of closed-set test samples (e.g., which should be correctly classified as belonging to one of the known classes) and open-set test samples (e.g., which belong to one or more unknown classes, and should not be classified as belonging to any of the known classes).

As will be explained in greater depth below, the systems and techniques can be trained to learn a task-agnostic open-set prototype (e.g., a task-agnostic open-set class) to which every sample is mapped if its true class is unavailable. The same task-agnostic open-set prototype can be used to detect and reject the open-set associated with multiple (e.g., different) episodes by classifying the open-set as the task-agnostic open-set prototype and rejecting them from inclusion in subsequent closed-set classification.

In one illustrative example, the open-set of test samples having an unknown or unseen class can change over episodes, based on the choice of N classes in the support set S provided as an inference input to each episode. For example, FIG. 4B illustrates a first episode 400b having a first open-set of queries with an unseen class, and FIG. 4C illustrates a second episode 400c having a second open-set of queries with an unseen class. The first episode 400b and the second episode 400c are built over the same underlying query set (e.g., the same embedded sample points are depicted in FIGS. 4B and 4C). Based on the choice of N classes that are identified or included in the support set provided for each of the episodes 400b and 400c, the composition of the open-set changes from episode 400b to 400c. The composition of the closed-set classifications also changes from episode 400b to 400c. For example, the first classification 410b (e.g., of the first episode 400b) includes a different set of queries/test samples than the first classification 410c (e.g., of the second episode 400c); the second classification 420b (e.g., of the first episode 400b) includes a different set of queries/test samples than the second classification 420c (e.g., of the second episode 400c); and the third classification 430b (e.g., of the first episode 400b) includes a different set of queries/test samples than the third classification 430c (e.g., of the second episode 400c); etc.

FIGS. 5A and 5B are diagrams illustrating example FSOSR tasks 500a and 500b, respectively, in which the classes for the open-sets and the closed-sets vary between the two tasks. As used herein, the terms "tasks" and "episodes" may be used interchangeably (e.g., an FSOSR task can also be referred to as an FSOSR episode). As illustrated, FSOSR task 500a and FSOSR task 500b can be performed based on the same underlying queries and/or sets of queries, with the designation of the sets of queries varying between open-set and closed-set across the two episodes. For example, in the context of FSOSR task 500a, the classes 'A' and 'B' are utilized as the closed sets 510a and 520a, respectively, and the classes 'C' and 'D' are utilized as the open sets 530a and 540a, respectively.

In the context of FSOSR task 500b, class 'A' is no longer treated as a closed set, but is instead utilized as an open set 510b. Similarly, class 'C' is no longer treated as an open set in the context of FSOSR task 500b, but is instead utilized as a closed set 530b. Classes 'B' and 'D' may be treated in the same manner for both FSOSR task 500a and FSOSR task 500b (e.g., the closed set 520a and the closed set 520b can be the same, and the open set 540a and the open set 540b can be the same). Because the determination or selection of the open and closed set classes is made from the same underlying set of queries and changes between FSOSR tasks 500a and 500b, some FSOSR approaches may determine an open-set prototype that correctly classifies the open-set queries in one of the two FSOSR tasks 500a, 500b, but not both. For example, some FSOSR approaches may determine a task-specific (e.g., episode-specific) open-set prototype that depends on the specific arrangement of open and closed-set classes included in the given FSOSR task or episode, and therefore may not be able to be generalized to other FSOSR episodes.

According to various implementations, systems and techniques can be used to perform FSOSR with open-set classification and/or rejection that is task-agnostic (e.g., can be performed across different episodes). For example, as illustrated in FIGS. 5A and 5B, FSOSR tasks 500a and 500b include an example task-agnostic open-set prototype $c^{ag}$ 572 that is the global-second best class for all samples in the embedding space. As will be described in greater depth below, the example task-agnostic open-set prototype $c^{ag}$ can be used to capture (e.g., classify and/or reject) the open-set samples for both tasks.

Figure 6:
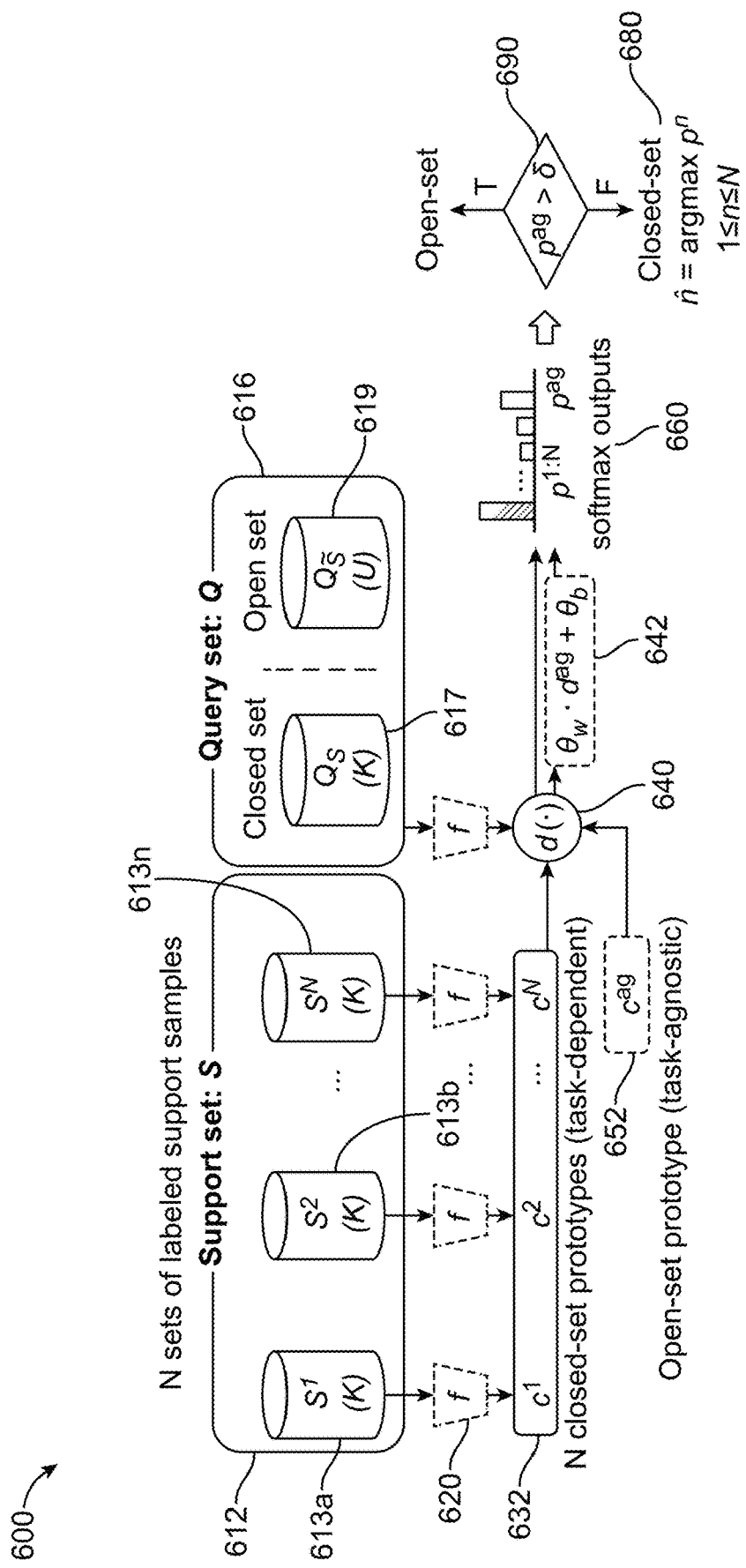
FIG. 6 is a diagram illustrating an example architecture of a task-agnostic open-set prototypical network, in accordance with some examples.

FIG. 6 is a diagram illustrating an example of a task-agnostic open-set prototype network 600 for performing FSOSR with task-agnostic (e.g., episode-agnostic or non-episode-specific) open-set recognition and/or rejection. In one illustrative example, the task-agnostic open-set prototype network 600 can perform FSOSR with adaptation to a varying open-set and/or varying open-set selection between episodes (e.g., between tasks). In some aspects, the task-agnostic open-set prototype network 600 can perform FSOSR by using a learned task-agnostic open-set prototype $c^{ag}$ to classify and reject open-set queries. The remaining closed-set queries can be classified into one or more closed-set classes based on using metric-based learning to learn a metric space in which distance metrics can classify the closed-set queries or other input samples.

In the context of the following discussion, an FSOSR task (e.g., also referred to as an FSOSR episode) can be given by:

$$T=\{\{S^n\}_{n=1}^N, Q|C_S, C_{\bar{S}}\} \qquad \text{Eq. (1)}$$

Here, T represents an FSOSR task or episode; $S^n$ is the support set provided for the closed set samples $C_S$; $C_{\bar{S}}$ is the open set (e.g., samples with a novel or unknown class, for which no support examples are given); Q is the set of queries (e.g., inference inputs) provided for the FSOSR task T; and N represents the number of classes included in the support set $S^n$ (e.g., N-way FSL is performed). The set of queries Q can include known queries $Q_S$ and unknown queries $Q_{\bar{S}}$, sampled from $C_S$ and $C_{\bar{S}}$, respectively.

In some examples, each FSOSR episode (e.g., training task 7) can be configured based on sampling the closed and open sets $C_S$ and $C_{\bar{S}}$, respectively, where $C_S=\{1, \ldots, N\}$, $|C_S|=N$, $|C_{\bar{S}}|=N$, $|C_S \cap C_{\bar{S}}|=\emptyset$. As was described previously, a closed class in a first episode may later be selected as an open class in a subsequent episode (e.g., because $C_S$ and $C_{\bar{S}}$ are randomly selected from the same class label space).

The support set $S^n$ is provided only for the closed set $C_S$, where $S^n=\{x_m^n, y_m^n\}_{m=1}^M$. Here, M is the number of support samples provided for the n-th closed class and $y_m^n$ (e.g., the label of the support sample $x_m^n$) is n.

In one illustrative example, training can be performed wherein a machine learning model (e.g., a neural network model) associated with the task-agnostic open-set prototype network 600 learns from a plurality of N-way M-shot pseudo-FSOSR episodes (e.g., a plurality of N-way M-shot pseudo-FSOSR tasks T, as given by Eq. (1) and described above). For example, each of the pseudo-FSOSR episodes can include N known classes with M support examples per class (e.g., such that each pseudo-FSOSR episode includes a total of N*M support examples) and one or more pseudo-unknown (e.g., pseudo-open-set) classes without any support examples. The pseudo-episodes used in training can be designed to mimic the FSOSR inference task by subsampling classes as well as data points.

With respect to the FSOSR inference task, inference can be performed over episodes that are each associated with a support set S and a query set Q. For example, FIG. 6 illustrates a support set S (indicated as 612) that includes one or more closed sets (indicated as 613a, 613b, ..., 613n and each labeled with (K) to denote a closed set) of known classes for which support examples are provided. For example, the support set 612 can correspond to the support set $S^n$ described above (e.g., where $S^n = \{x_m^n, y_m^n\}_{m=1}^M$). In some aspects, the support set 612 can include a first closed set $S^1$ that includes M support samples for a first class, a second closed set $S^2$ that includes M support samples for a second class, ..., and an n-th closed set $S^N$ that includes M support samples for an n-th class.

FIG. 6 also illustrates a query set Q (indicated as 616) that includes both a closed set $Q_S$ of queries belonging to known classes K (e.g., indicated as 617) and an open set $Q_{\bar{S}}$ of queries belonging to unknown classes U without support examples (e.g., indicated as 619). It is noted that although the set of closed-set samples 613a, 613b, ..., 613n (e.g., of support set 612) and the closed-set of samples 617 (e.g., of the query set 616) may correspond to the same underlying known classes, it is not necessarily the case that the constituent samples within 613a, 613b, ..., 613n are the same as the constituent samples within 617.

In one illustrative example, the support set S (e.g., 612) can include M samples for each of the N classes, as described above. The query set Q (e.g., 616) can include one or more queries from the N known classes (e.g., 617) and can further include one or more queries from $N_U$ unknown classes (e.g., 619), where:

|S|=N·M

|Q|=(N+N_U)·M_Q

Here, $M_Q$ can represent the number of queries for each class. In some cases, $M_Q$ can be equal to M, although $M_Q$ may also be greater than or less than M. At the time of inference, all classes in the evaluation data set may be unseen by the example task-agnostic open-set prototype network 600. In some examples, the evaluation data set can be the same as the query set 616. Inference can be performed using episodes that include N known classes with support samples (e.g., the set 617) and $N_u$ unknown open-set classes without support samples (e.g., the set 619). Note that in the inference episodes, an evaluation data set (e.g., 617) does not necessarily include M support examples for each of the N classes, as is the case for the support set S (e.g., 612).

As mentioned previously, the task-agnostic open-set prototype network 600 can perform FSOSR based at least in part on one or more metric-based learning approaches. For example, in an N-way M-shot episode, the task-agnostic open-set prototype network 600 can determine the class of a given query x based on the distance(s) between the query x and the closed set classes $C_S=\{1, \ldots, N\}$. A representative feature (e.g., a prototype) of the class $n \in C_S$ can be generated by averaging the features of the support samples in $S^n$.

For example, the task-agnostic open-set prototype network 600 can determine or otherwise obtain N prototypes for the closed set $C_S$ by using the average of the embedded support samples of each class, n, to calculate the corresponding prototype for each class, $\{c^n\}_{n=1}^N$, where:

$$c^n = \frac{1}{M}\sum_{i=1}^M f(x_i^n) \qquad \text{Eq. (2)}$$

Here, f is an encoder (e.g., a feature embedding network) and $f(\cdot) \in \mathbb{R}^D$. In the example of FIG. 6, an encoder or feature embedding network 620 can be used to generate embeddings for each support sample included in the support set 612. In some examples, each sub-portion of the support set 612 (e.g., $S^1, \ldots, S^N$) can be provided to a separate instance of the feature embedding network 620. In some examples, the sub-portions of the support set 612 can be provided to a single instance of the feature embedding network 620 in order to generate the corresponding embeddings for the support set 612.

As illustrated, the output of feature embedding network(s) 620 (e.g., the embeddings determined for each support sample included in support set 612) can be used to generate the N closed-set prototypes $c^1, c^2, \ldots, c^N$ based on Eq. (2). The resulting closed-set prototypes 632 may be task-dependent prototypes, because each closed-set prototype $c^n$ is generated with a dependence on the particular selection of the closed sets within support set 612.

The feature embedding network(s) 620 may additionally be used to generate one or more embeddings based on receiving as input some or all of the query samples included in query set 616. For example, the feature embedding network(s) 620 can be used to determine the task-dependent closed-set prototypes $c^n$ 632 and may also be used to determine embeddings for each query sample of query set 616. Subsequently, metric-based classification can be performed for the closed set queries $Q_S$ 617 and the unknown/open set queries $Q_{\bar{S}}$ 619 based at least in part on analyzing the embeddings determined for each query (e.g., of query set 616) against the prototype embeddings $c^n$ 632, as will be described in greater depth below.

In some aspects, the feature embedding network(s) 620 may receive as input (e.g., for each episode) the support set 612 and the query set 616. In one illustrative example, feature embedding network 620 can be a neural network or other machine learning network that generates embeddings based on the support set 612 and/or query set 616 (e.g., the prototypes $c^n$ 632 can be determined by averaging the embeddings generated for each class N by the feature embedding network f 620).

Based on the task-dependent, closed-set prototypes $c^n$, the task-agnostic open-set prototype network 600 can determine or otherwise obtain a probability distribution over the N known classes, such that the classification probability of a given query x over each class n is given by:

$$p^n(x) = \frac{\exp(-d(f(x), c^n))}{\sum_{n' \in C_S}^N \exp(-d(f(x), c^{n'}))} \qquad \text{Eq. (3)}$$

In some aspects, the classification probability given in Eq. (3) can be proportional to the negative of a distance metric d(·, ·) (e.g., depicted in FIG. 6 as the distance metric 640). In one illustrative example, the distance metric 640 can be determined based on a Euclidean distance, d(a, a')=∥a−a'∥², although various other distance metrics may also be utilized without departing from the scope of the present disclosure. Based on Eq. (3), the systems and techniques described herein can use the task-agnostic open-set prototype network 600 to minimize a negative log-probability of the true class.

In one illustrative example, the probability distribution of Eq. (3) can be used to classify a given input query x by determining the distance (e.g., using the distance metric 640/Eq. (3)) between the query example x and the prototypical representation $c^n$ 632 for each class. For example, if the input query example x is closest to class number three (e.g., of the N classes), then a relatively high probability can be determined for class three and a relatively lower probability for the remaining N−1 classes. For example, these probabilities can be determined based on Eq. (3), which itself can be determined based on the distance metric 640.

In one illustrative example, the systems and techniques described herein can further determine one or more task-agnostic open-set prototypes $c^{ag}$, depicted in FIG. 6 as the task-agnostic open-set prototype 652. As will be described in greater depth below, the task-agnostic open-set prototype 652 can be a learnable prototype that can be used to classify and/or reject open-set queries across different tasks or episodes. In some aspects, the task-agnostic open-set prototype 652 can be generated and used to extend the previously described metric-based classification to the open-set queries 619 in addition to the closed-set queries 617. In some examples, the task-agnostic open-set prototype 652 is consistent with overall tasks (e.g., based on being task-agnostic).

Given $\forall n \in C_S$ in a task, the following two ordinal relations for a given input query x can be considered, based on the membership of the input query x to either the closed set $Q_S$ 617 or the unknown/open set $Q_{\bar{S}}$ 619:

$$x \in Q_S : d(f(x), c^y) < \min(d(f(x), c^{ag}), d(f(x), c^n)) \quad \text{Eq. (4)}$$

where y is the ground-truth class of x and n≠y, and:

$$x - Q_{\bar{S}} : d(f(x), c^{ag}) < d(f(x), c^n) \quad \text{Eq. (5)}$$

Combining Eqs. (4) and (5) provides a general relation regardless of the membership of the input query x:

$$d(f(x), c^y) < d(f(x), c^{ag}) < d(f(x), c^n) \quad \text{Eq. (6)}$$

In one illustrative example, Eq. (6) can be applied for all n, where n≠y. Based on Eq. (6), the task-agnostic open-set prototype $c^{ag}$ 652 can be seen to be the nearest prototype for any query (e.g., of query set 616) except for the prototype $c^n$ corresponding to the query's ground-truth class. In other words, when the input query x is chosen as an open-set sample (e.g., belonging to the open-set 619) the task-agnostic open-set prototype $c^{ag}$ 652 can reliably be used to reject the open-set sample x. As will be described in greater depth below, by learning the open-set prototype $c^{ag}$ 652 in a task-agnostic (e.g., episode-agnostic) manner, the performance of the example network 600 can be improved for metric-based FSOSR classification tasks.

As mentioned previously, the task-agnostic open-set prototype $c^{ag}$ 652 can be learned such that it represents the closest classification match for any given query sample of the query set 616, if the given query sample is selected as an open-set sample for which its true class is unavailable. In one illustrative example, the task-agnostic open-set prototype $c^{ag}$ 652 is learned such that it satisfies a global-second-best classification criteria for any given query sample (e.g., for a given query sample, the only classification with a greater probability based on Eq. (3) is the actual, true underlying class of the query sample when it belongs to the known closed set 617; if the query sample belongs to the unknown open set 619, the true underlying class is unavailable to the FSOSR network 600, and the task-agnostic open-set prototype $c^{ag}$ 652 is the best or most likely class for the open-set query sample within the context of the current episode).

The task-agnostic open-set prototype $c^{ag}$ 652 can be implemented as a D-dimensional learnable feature associated with FSOSR network 600, as mentioned previously. In some aspects, one or more learnable scaling factors can be used to better satisfy the ordinal relation of Eq. (6), such that a single $c^{ag}$ can be learned to satisfy Eq. (6) in a task-agnostic manner across multiple different tasks or episodes.

As illustrated in FIG. 6, the example task-agnostic open-set prototype network 600 can further include the learnable scaling factors $\theta_w$ and/or $\theta_b$. In some examples, $\theta_w$ and/or $\theta_b$ can be scalar-valued. In one illustrative example, the learnable scaling factors $\theta_w$ and/or $\theta_b$ can be used to determine a scaled distance metric 642, depicted in FIG. 6 as the scaled distance metric $\theta_w \cdot d^{ag} + \theta_b$. Here, the distance value $d^{ag}$ can be determined as the distance metric between f(x), the embedding of a query sample x, and the task-agnostic open-set prototype $c^{ag}$ 652 (e.g., $d^{ag} = d(f(x), c^{ag})$). In some aspects, the distance value $d^{ag}$ can be determined using the distance metric 640, which provides the distance value $d^{ag}$ as input to the scaled distance metric 642.

In one illustrative example, the learnable scaling factors $\theta_w$ and/or $\theta_b$ can be learned in conjunction or combination with the learnable task-agnostic open-set prototype 652. In some aspects, the example FSOSR network 600 can implement one or more (or all) of the feature embedding network (s)f 620, the task-agnostic open-set prototype $c^{ag}$ 652, the scaling factor $\theta_w$, and the scaling factor $\theta_b$ as learnable components or learnable modules that are learned during training (e.g., as will be described in greater depth below).

In one illustrative example, the task-agnostic open-set prototype $c^{ag}$ 652 can be used to compute softmax probability outputs 660 of a given input query x for the N+1 classes (e.g., representing the N closed-set classes+$c^{ag}$) as follows:

$$p^n(x) = \frac{\exp(-d(f(x), c^n))}{\exp(-d(f(x), c^{ag})\theta_w + \theta_b) + \sum_{n'=1}^{N} \exp(-d(f(x), c^{n'}))} \quad \text{Eq. (7)}$$

$$p^{ag}(x) = \frac{\exp(-d(f(x), c^{ag})\theta_w + \theta_b)}{\exp(-d(f(x), c^{ag})\theta_w + \theta_b) + \sum_{n'=1}^{N} \exp(-d(f(x), c^{n'}))} \quad \text{Eq. (8)}$$

Here, n=1, . . . , N. In some aspects, based on the learned task-agnostic open-set prototype $c^{ag}$ 652 and the learned scaling factors $\theta_w$ and $\theta_b$, a given input query sample x can be classified as an open-set sample or a closed-set sample using a classification block 690. For example, the given input query sample x can be classified as an open-set sample at classification block 690 based on determining that $p^{ag}(x) > \delta$, where $\delta$ is a pre-defined threshold for classifying open-set query samples. As illustrated in FIG. 6, if the classification block 690 determines that $p^{ag}(x) > \delta$ is false (e.g., if classification block 690 determines instead $p^{ag} < \delta$), the input query sample x can otherwise be classified into the nearest closed (e.g., known) class n̂, where n̂=argmax$_{n \in C_S} p^n(x)$.

The argmax-based classification of closed-set input query samples is depicted in FIG. 6 as the closed-set classification block 680.

As mentioned previously, the probability distributions $p^n(x)$ and $p^{ag}(x)$ of Eqs. (7) and (8), respectively, can be determined using the learnable components or modules given by the feature embedding network(s) f 620, the task-agnostic open-set prototype $c^{ag}$ 652, the scaling factor $\theta_w$, and the scaling factor $\theta_b$. In some examples, the feature embedding network(s) f 620, the task-agnostic open-set prototype $c^{ag}$ 652, the scaling factor $\theta_w$, and the scaling factor $\theta_b$ can be learned to be conducive to $d(f(x), c^{ag})$ such that the ordinal relation of Eq. (6) is attained or otherwise implemented.

In one illustrative example, the example FSOSR network 600 can be trained to optimize its feature extractor (e.g., the feature embedding network(s) f 620), the task-agnostic open-set prototype $c^{ag}$ 652, and the scaling factors $\theta_w$, $\theta_b$ by minimizing a total loss function given by:

$$\mathcal{L} = \mathcal{L}_{opn} + \beta \mathcal{L}_{sec} + \gamma \mathcal{L}_{ppe} \qquad \text{Eq. (9)}$$

Here, $\mathcal{L}_{opn}$ represents an open-set loss. In some aspects, based on the task-agnostic open-set prototype $c^{ag}$ 652, the training process can consider (N+1)-way classification, where 1, ..., N denote N classes in the closed-set(s) of the support set 613 and the closed query set 617, and (N+1) denotes the task-agnostic open-set class represented by the prototype $c^{ag}$ 652. In some examples, the ground-truth class of the open-set samples can be set to N+1 during training, and $p^{(N+1)} = p^{ag}$. Based on the above, the open-set loss $\mathcal{L}_{opn}$ can be determined as:

$$\mathcal{L}_{opn} = \frac{1}{|Q|} \sum_{(x_i, y_i) \in Q} -\alpha^{y_i} \log p^{y_i}(x_i) \qquad \text{Eq. (10)}$$

Here, $\alpha^{y_i}$ is a hyperparameter to balance between the open and closed sets. In some examples, a $\alpha^{y_i} \leq 1$ when $y_i = N+1$, $\alpha^{y_i} = 1$ otherwise.

In some aspects, the example FSOSR network 600 can be explicitly forced (e.g., during training) to satisfy the ordinal relation of Eq. (6) by implementing a second-best loss for the closed set as follows:

$$\mathcal{L}_{sec} = \frac{1}{|Q_S|} \sum_{(x_i, y_i) \in Q_S} -\log p^{N+1}(x_i)_{\setminus \{y_i\}} \qquad \text{Eq. (11)}$$

Here, $\mathcal{L}_{sec}$ represents a second-best loss, where $x_i$ is a closed-set sample and $p^{N+1}(x_i)_{\setminus \{y_i\}}$ represents the softmax probability of the task-agnostic open-set class, which is computed without considering its ground truth class y.

In some aspects, the examples FSOSR network 600 can additionally be trained to regularize the distances from the task-agnostic open-set prototype $c^{ag}$ 652 to the prototypes $c^n$ 632, and simultaneously the distances between the prototypes. In one illustrative example, the cosine entropy for each pair of the prototypes can be maximized by:

$$\mathcal{L}_{ppe} = \frac{1}{N_{pair}} \sum_{i=1}^{N} \sum_{j=i+1}^{N} \left\| (z^i)^T z^j + 1 \right\|_2^2 \qquad \text{Eq. (12)}$$

Here, $\mathcal{L}_{ppe}$ represents a pairwise prototype entropy loss, where $$z^n = \frac{c^n - c^{ag}}{|c^n - c^{ag}|}$$

and $N_{pair} = N(N-1)/2$ is the number of the pairs of the prototypes.

Finally, as mentioned previously, the feature extractor (e.g., the feature embedding network(s) f 620), the task-agnostic open-set prototype $c^{ag}$ 652, and the scaling factors $\theta_w$, $\theta_b$ can be optimized during training of the examples FSOSR network 600 by minimizing the total loss function given by Eq. (9).

Figure 7:
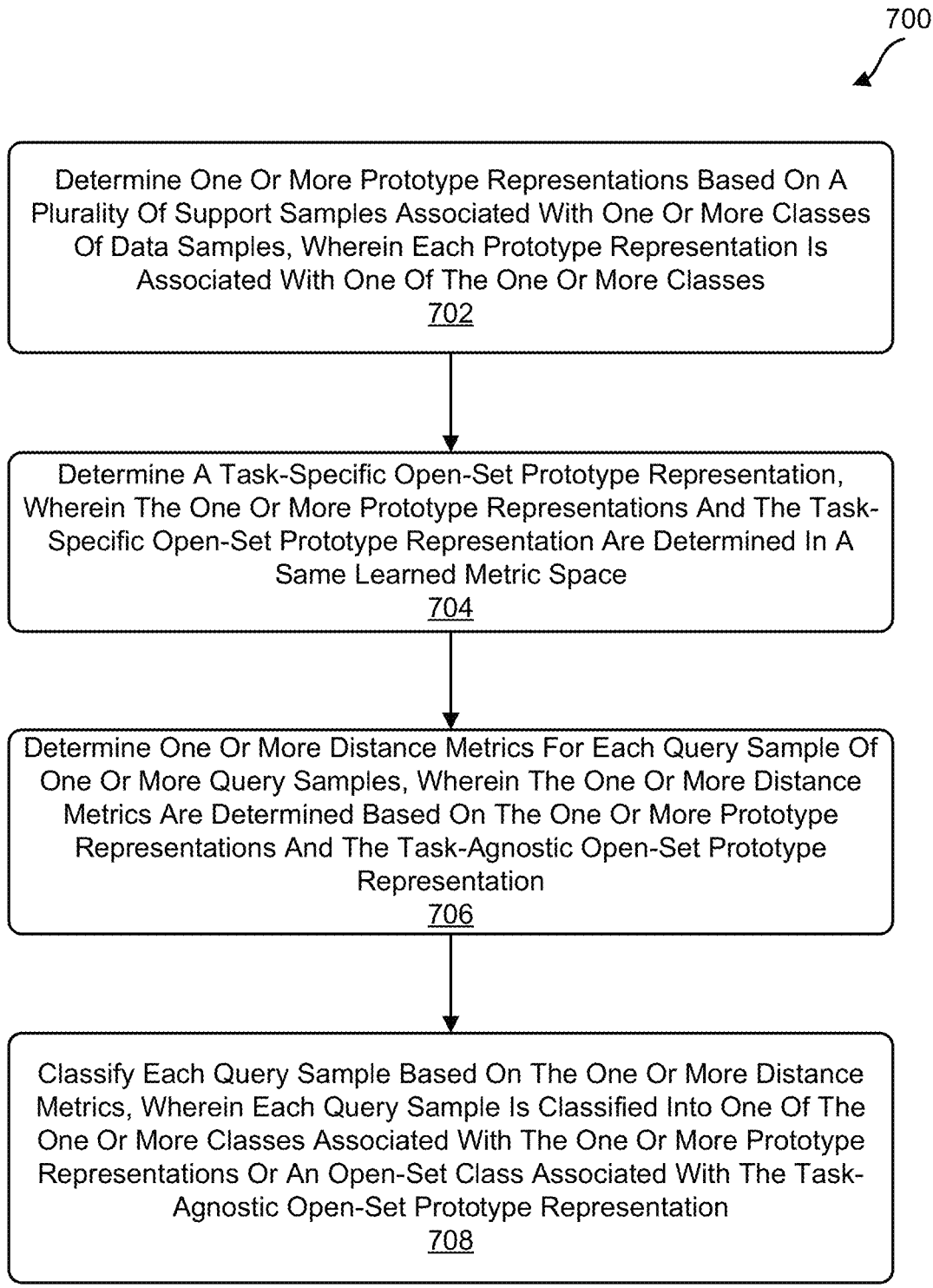
FIG. 7 is a flow diagram illustrating an example of a process for processing one or more data samples to perform FSOSR based on a task-agnostic open-set prototype, in accordance with some examples.

FIG. 7 is a flowchart illustrating an example of a process 700 for performing few-shot open-set recognition (FSOSR) using a task-agnostic open-set prototype. At block 702, the process 700 includes determining one or more prototype representations based on a plurality of support samples associated with one or more classes of data samples.

Each prototype representation can be associated with one of the one or more classes. For example, the one or more prototype representations can be determined using the example task-agnostic open-set prototype network 600 illustrated in FIG. 6. In some examples, the one or more prototype representations can be determined by a machine learning and/or neural network encoder, such as the feature embedding network(s) 620 illustrated in FIG. 6. The one or more prototype representations can be determined based on receiving as input the plurality of support samples, wherein each support sample is associated with (e.g., labeled with) a known class. For example, the one or more prototype representations can be determined based on a plurality of support samples included in the support set 612 illustrated in FIG. 6. In some cases, the plurality of support samples can include one or more sub-portions where each sub-portion includes the support samples associated with a particular one of the one or more classes of data samples. For example, the plurality of support samples can include one or more (or all) of the sub-portions of support samples 613a, 613b, ..., 613n illustrated in FIG. 6. In some examples, the encoder (e.g., feature embedding network(s) 620) can generate a plurality of embeddings for the plurality of support samples associated with each class. A prototype representation can then be determined for each class as the mean of its embedded support samples. For example, the mean of the embedded support samples for each class can be determined based on a Euclidean distance metric to generate a set of task-dependent closed-set prototypes such as the prototypes 632 illustrated in FIG. 6.

At block 704, the process 700 includes determining a task-agnostic open-set prototype representation. For example, the task-agnostic open-set prototype representation can include the task-agnostic open-set prototype representation 652 illustrated in FIG. 6. In some examples, the one or more prototype representations and the task-agnostic open-set prototype representation can be determined in a same learned metric space. For example, the one or more prototype representations and the task-agnostic open-set prototype representation can be determined in a same learned embedding space of a neural network encoder, such as the feature embedding network(s) 620 illustrated in FIG. 6 (e.g., the task-agnostic open-set prototype representation can be determined in the same embedding space associated with the feature embedding network(s) 620 used to generate embeddings associated with the one or more prototype representations).

In some examples, the plurality of support samples used to generate the one or more prototype representations (e.g., the support set 612 illustrated in FIG. 6) can be obtained for or otherwise associated with a single few-shot learning (FSL) episode. In some cases, the task-agnostic open-set prototype representation can be an episode-agnostic open-set prototype representation.

At block 706, the process 700 includes determining one or more distance metrics for each query sample of one or more query samples, wherein the one or more distance metrics are determined based on the one or more prototype representations and the task-agnostic open-set prototype representation. For example, the one or more distance metrics can be determined using a distance function 640, as illustrated in FIG. 6. In some examples, the distance metric can be a Euclidean distance between each query sample and each of the prototype representations and the task-agnostic open-set prototype representation. In some cases, the one or more query samples can be included in a query set, such as the query set 616 illustrated in FIG. 6. The one or more query samples can include open-set queries (e.g., included in an open-set of queries 619) and closed-set queries (e.g., included in a closed-set of queries 617).

In some examples, determining the one or more distance metrics further includes scaling the Euclidean distance metric between a given query sample and the task-agnostic open-set prototype representation using one or more learned scaling factors. For example, the Euclidean distance metric can be scaled using one or more learned scaling factors such as the learned scaling factors 642 illustrated in FIG. 6. In some cases, determining the one or more distance metrics can additionally, or alternatively, include scaling the Euclidean distance metric between the given query sample and each prototype representation of the one or more prototype representations using the one or more learned scaling factors.

In some cases, the one or more learned scaling factors can be determined as a first scalar value and a second scalar value. For example, the first scalar value and the second scalar value can be learned based on a loss function that enforces the task-agnostic open-set prototype representation as a task-agnostic global-second-best classification for each query sample of the one or more query samples. In some examples, the one or more learned scaling factors can be learned as task-agnostic scaling factors. In some cases, the task-agnostic open-set prototype representation may be a global-second best classification for a plurality of few-shot open-shot recognition (FSOSR) episodes performed over the data samples.

At block 708, the process 700 includes classifying each query sample based on the one or more distance metrics, wherein each query sample is classified into one of the one or more classes associated with the one or more prototype representations or an open-set class associated with the task-agnostic open-set prototype representation.

For example, the query samples can be classified using one or more softmax outputs, such as the N+1 softmax outputs 660 illustrated in FIG. 6. In some examples, the one or more softmax outputs can include one or more probability distributions determined based on a distance metric determined between a given query sample and each of the one or more closed set prototypes and a probability distribution determined based on a distance metric (e.g., the scaled distance metric 642) determined between the given query sample and the task-agnostic open-set prototype. In some examples, the softmax classification can be based on or otherwise utilize the distance metrics described above with respect to block 706. For example, the softmax classification can classify a given query sample into one of the classes associated with the prototype representations or into an open-set class associated with the task-agnostic open-set prototype representation.

In some examples, classifying each query sample based on the one or more distance metrics can include determining a probability distribution over the one or more classes and the open-set class. For example, the probability distribution can be determined based at least in part on the Euclidean distance metric determined between each query sample and a respective prototype associated with each class of the one or more classes. A probability distribution can additionally, or alternatively, be determined based at least in part on a Euclidean distance metric determined between each query sample and the task-agnostic open-set prototype representation. In some aspects, each query sample can be classified into one of the one or more closed-set classes or into the open-set class, based on the probability distribution(s).

In some cases, open-set rejection (OSR) can be performed based on a set of classified query samples classified into the open-set class associated with the task-agnostic open-set prototype representation. For example, performing OSR can include determining a probability that each query sample is included in the open-set class associated with the task-agnostic open-set prototype representation, based on the probability distribution determined for the open-set class (e.g., using the task-agnostic open-set prototype representation and/or the scaled distance metric between the given query sample and the task-agnostic open-set prototype representation), and comparing the determined probability to a pre-determined threshold. In some cases, classifying each query sample based on the one or more distance metrics can further include classifying a given query sample as being included in the open-set class based on a determination that the probability the given query sample is included in the open-set class is greater than the pre-determined threshold, and classifying the given query sample as being included in a closed-set class based on a determination that the probability the given query sample is included in the open-set class is not greater than the pre-determined threshold. IN some cases, each query sample classified as being included in the closed-set class can be further into a respective class of the one or more classes. For example, each query sample can be classified based on maximizing a respective probability determined between each query sample and each respective class of the one or more classes. In some examples, the respective probability can be an argmax probability.

In some examples, classifying each query sample can include providing each query sample to a trained few-shot open-shot recognition (FSOSR) neural network classifier, wherein the trained FSOSR neural network classifier includes at least the task-agnostic open-set prototype representation and one or more distance scaling factors as learnable components. In some cases, the trained FSOSR neural network classifier can further include one or more feature embedding networks as a learnable component. For example, the trained FSOSR neural network classifier can determine the one or more distance metrics for each query sample based on determining an embedding for each query sample of the one or more query samples using the one or more feature embedding networks. For example, using the embeddings, the one or more prototype representations can be determined as an average embedding of a set of embeddings determined for the plurality of support samples associated with each class of the one or more classes. Each distance metric of the one or more distance metrics can subsequently be generated based on a Euclidean distance metric between the embedding determined for a given query sample and the embedding determined for each prototype representation of the one or more prototype representations associated with the one or more classes.

Further aspects and examples related to the present disclosure are included in Appendix A attached hereto.

In some examples, the processes described herein (e.g., process 700 and/or any other process described herein) may be performed by a computing device, apparatus, or system. In one example, the process 700 can be performed by a computing device or system having the computing device architecture 800 of FIG. 8. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 700 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 700 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
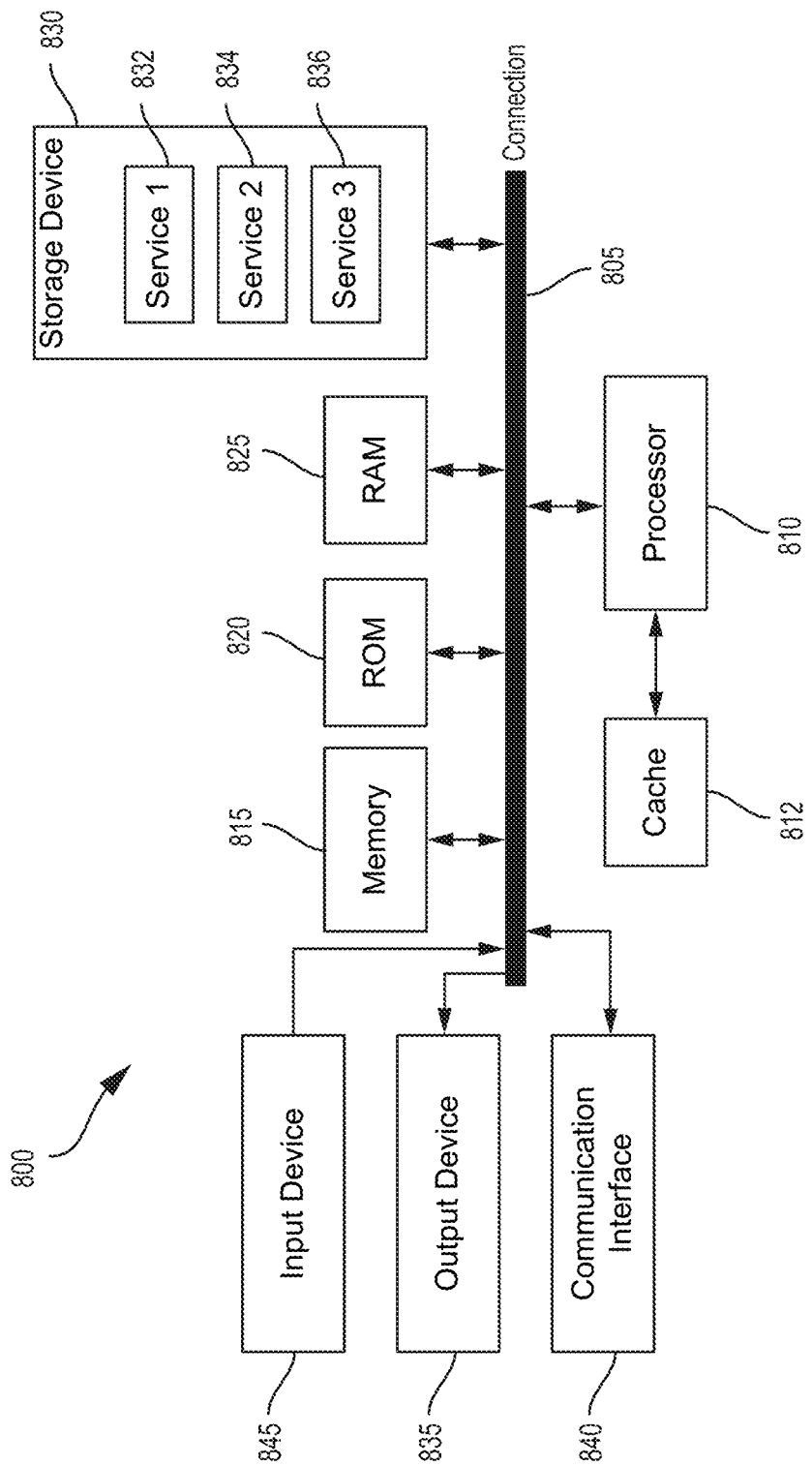
FIG. 8 is a block diagram illustrating an example of a computing system for implementing certain aspects described herein.

FIG. 8 illustrates an example computing device architecture 800 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 800 are shown in electrical communication with each other using connection 805, such as a bus. The example computing device architecture 800 includes a processing unit (CPU or processor) 810 and computing device connection 805 that couples various computing device components including computing device memory 815, such as read only memory (ROM) 820 and random-access memory (RAM) 825, to processor 810.

Computing device architecture 800 can include a cache of high-speed memory connected directly with, in close proximity to, or integrated as part of processor 810. Computing device architecture 800 can copy data from memory 815 and/or the storage device 830 to cache 812 for quick access by processor 810. In this way, the cache can provide a performance boost that avoids processor 810 delays while waiting for data. These and other engines can control or be configured to control processor 810 to perform various actions. Other computing device memory 815 may be available for use as well. Memory 815 can include multiple different types of memory with different performance characteristics. Processor 810 can include any general-purpose processor and a hardware or software service, such as service 1 832, service 2 834, and service 3 836 stored in storage device 830, configured to control processor 810 as well as a special-purpose processor where software instructions are incorporated into the processor design. Processor 810 may be a self-contained system, containing multiple cores or processors, a bus, memory controller, cache, etc. A multi-core processor may be symmetric or asymmetric.

To enable user interaction with the computing device architecture 800, input device 845 can represent any number of input mechanisms, such as a microphone for speech, a touch-sensitive screen for gesture or graphical input, keyboard, mouse, motion input, speech and so forth. Output device 835 can also be one or more of a number of output mechanisms known to those of skill in the art, such as a display, projector, television, speaker device, etc. In some instances, multimodal computing devices can enable a user to provide multiple types of input to communicate with computing device architecture 800. Communication interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. Storage device 830 can include services 832, 834, 836 for controlling processor 810. Other hardware or software modules or engines are contemplated. Storage device 830 can be connected to the computing device connection 805. In one aspect, a hardware module that performs a particular function can include the software component stored in a computer-readable medium in connection with the necessary hardware components, such as processor 810, connection 805, output device 835, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method (e.g., a processor-implemented method) for processing one or more data samples, the method comprising: determining one or more prototype representations based on a plurality of support samples associated with one or more classes of data samples, wherein each prototype representation is associated with one of the one or more classes; determining a task-agnostic open-set prototype representation, wherein the one or more prototype representations and the task-agnostic open-set prototype representation are determined in a same learned metric space; determining one or more distance metrics for each query sample of one or more query samples, wherein the one or more distance metrics are determined based on the one or more prototype representations and the task-agnostic open-set prototype representation; and classifying each query sample based on the one or more distance metrics, wherein each query sample is classified into one of the one or more classes associated with the one or more prototype representations or an open-set class associated with the task-agnostic open-set prototype representation.

Aspect 2: The processor-implemented method of Aspect 1, wherein determining the one or more distance metrics for each query sample further comprises: determining a Euclidean distance metric between a given query sample and each prototype representation of the one or more prototype representations associated with the one or more classes; and determining a Euclidean distance metric between the given query sample and the task-agnostic open-set prototype representation.

Aspect 3: The processor-implemented method of Aspect 2, further comprising: scaling the Euclidean distance metric between the given query sample and the task-agnostic open-set prototype representation using one or more learned scaling factors.

Aspect 4: The processor-implemented method of Aspect 3, further comprising: scaling the Euclidean distance metric between the given query sample and each prototype representation of the one or more prototype representations using the one or more learned scaling factors.

Aspect 5: The processor-implemented method of any of Aspects 3 to 4, wherein: the one or more learned scaling factors are determined as a first scalar value and a second scalar value; and the first scalar value and the second scalar value are learned based on a loss function that enforces the task-agnostic open-set prototype representation as a task-agnostic global-second-best classification for each query sample of the one or more query samples.

Aspect 6: The processor-implemented method of Aspect 5, wherein: the one or more learned scaling factors are task-agnostic scaling factors; and the task-agnostic open-set prototype representation is a global-second best classification for a plurality of few-shot open-shot recognition (FSOSR) episodes performed over the data samples.

Aspect 7: The processor-implemented method of any of Aspects 1 to 6, wherein classifying each query sample based on the one or more distance metrics comprises: determining a probability distribution over the one or more classes and the open-set class, wherein the probability distribution is determined based at least in part on a Euclidean distance metric determined between each query sample and a respective prototype associated with each class of the one or more classes and a Euclidean distance metric determined between each query sample and the task-agnostic open-set prototype representation; and classifying, based on the probability distribution, each query sample into one of the one or more classes or into the open-set class.

Aspect 8: The processor-implemented method of Aspect 7, further comprising: performing open-set rejection (OSR) based on a set of classified query samples classified into the open-set class associated with the task-agnostic open-set prototype representation.

Aspect 9: The processor-implemented method of any of Aspects 7 to 8, wherein classifying each query sample based on the one or more distance metrics further comprises: determining a probability that each query sample is included in the open-set class associated with the task-agnostic open-set prototype representation, based on the probability distribution; and comparing the determined probability to a pre-determined threshold.

Aspect 10: The processor-implemented method of Aspect 9, further comprising: classifying a given query sample as being included in the open-set class based on a determination that the probability the given query sample is included in the open-set class is greater than the pre-determined threshold; and classifying the given query sample as being included in a closed-set class based on a determination that the probability the given query sample is included in the open-set class is not greater than the pre-determined threshold.

Aspect 11: The processor-implemented method of Aspect 10, further comprising: classifying each query sample classified as being included in the closed-set class into a respective class of the one or more classes, wherein each query sample is classified based on maximizing a respective probability determined between each query sample and each respective class of the one or more classes.

Aspect 12: The processor-implemented method of Aspect 11, wherein the probability is an argmax probability.

Aspect 13: The processor-implemented method of any of Aspects 1 to 12, wherein classifying each query sample comprises: providing each query sample to a trained few-shot open-shot recognition (FSOSR) neural network classifier, wherein the trained FSOSR neural network classifier includes at least the task-agnostic open-set prototype representation and one or more distance scaling factors as learnable components.

Aspect 14: The processor-implemented method of Aspect 13, wherein the trained FSOSR neural network classifier further includes one or more feature embedding networks as a learnable component.

Aspect 15: The processor-implemented method of Aspect 14, wherein determining the one or more distance metrics for each query sample further comprises: determining an embedding for each query sample of the one or more query samples using the one or more feature embedding networks; determining the one or more prototype representations as an average embedding of a set of embeddings determined for the plurality of support samples associated with each class of the one or more classes; and determining each distance metric of the one or more distance metrics based on determining a Euclidean distance metric between the embedding determined for a given query sample and the embedding determined for each prototype representation of the one or more prototype representations associated with the one or more classes.

Aspect 16: The processor-implemented method of any of Aspects 1 to 15, wherein the plurality of support samples are obtained for a single few-shot learning (FSL) episode and the task-agnostic open-set prototype representation is an episode-agnostic open-set prototype representation.

Aspect 17: An apparatus for processing one or more data samples, comprising: at least one memory; and at least one processor coupled to the at least one memory and configured to: determine one or more prototype representations based on a plurality of support samples associated with one or more classes of data samples, wherein each prototype representation is associated with one of the one or more classes; determine a task-agnostic open-set prototype representation, wherein the one or more prototype representations and the task-agnostic open-set prototype representation are determined in a same learned metric space; determine one or more distance metrics for each query sample of one or more query samples, wherein the one or more distance metrics are determined based on the one or more prototype representations and the task-agnostic open-set prototype representation; and classify each query sample based on the one or more distance metrics, wherein each query sample is classified into one of the one or more classes associated with the one or more prototype representations or an open-set class associated with the task-agnostic open-set prototype representation.

Aspect 18: The apparatus of Aspect 17, wherein to determine the one or more distance metrics for each query sample, the at least one processor is further configured to: determine a Euclidean distance metric between a given query sample and each prototype representation of the one or more prototype representations associated with the one or more classes; and determine a Euclidean distance metric between the given query sample and the task-agnostic open-set prototype representation.

Aspect 19: The apparatus of Aspect 18, wherein the at least one processor is further configured to: scale the Euclidean distance metric between the given query sample and the task-agnostic open-set prototype representation using one or more learned scaling factors.

Aspect 20: The apparatus of Aspect 19, wherein the at least one processor is further configured to: scale the Euclidean distance metric between the given query sample and each prototype representation of the one or more prototype representations using the one or more learned scaling factors.

Aspect 21: The apparatus of any of Aspects 19 to 20, wherein: the one or more learned scaling factors are determined as a first scalar value and a second scalar value; and the first scalar value and the second scalar value are learned based on a loss function that enforces the task-agnostic open-set prototype representation as a task-agnostic global-second-best classification for each query sample of the one or more query samples.

Aspect 22: The apparatus of Aspect 21, wherein: the one or more learned scaling factors are task-agnostic scaling factors; and the task-agnostic open-set prototype representation is a global-second best classification for a plurality of few-shot open-shot recognition (FSOSR) episodes performed over the data samples.

Aspect 23: The apparatus of any of Aspects 17 to 22, wherein to classify each query sample based on the one or more distance metric, the at least one processor is configured to: determine a probability distribution over the one or more classes and the open-set class, wherein the probability distribution is determined based at least in part on a Euclidean distance metric determined between each query sample and a respective prototype associated with each class of the one or more classes and a Euclidean distance metric determined between each query sample and the task-agnostic open-set prototype representation; and classify, based on the probability distribution, each query sample into one of the one or more classes or into the open-set class.

Aspect 24: The apparatus of Aspect 23, wherein the at least one processor is further configured to: perform open-set rejection (OSR) based on a set of classified query samples classified into the open-set class associated with the task-agnostic open-set prototype representation.

Aspect 25: The apparatus of any of Aspects 23 to 24, wherein to classify each query sample based on the one or more distance metrics, the at least one processor is further configured to: determine a probability that each query sample is included in the open-set class associated with the task-agnostic open-set prototype representation, based on the probability distribution; and compare the determined probability to a pre-determined threshold.

Aspect 26: The apparatus of Aspect 25, wherein the at least one processor is further configured to: classify a given query sample as being included in the open-set class based on a determination that the probability the given query sample is included in the open-set class is greater than the pre-determined threshold; and classify the given query sample as being included in a closed-set class based on a determination that the probability the given query sample is included in the open-set class is not greater than the pre-determined threshold.

Aspect 27: The apparatus of Aspect 26, wherein the at least one processor is further configured to classify each query sample classified as being included in the closed-set class into a respective class of the one or more classes, wherein each query sample is classified based on maximizing a respective probability determined between each query sample and each respective class of the one or more classes.

Aspect 28: The apparatus of Aspect 27, wherein the probability is an argmax probability.

Aspect 29: The apparatus of any of Aspects 17 to 28, wherein to classify each query sample, the at least one processor is configured to: provide each query sample to a trained few-shot open-shot recognition (FSOSR) neural network classifier, wherein the trained FSOSR neural network classifier includes at least the task-agnostic open-set prototype representation and one or more distance scaling factors as learnable components.

Aspect 30: The apparatus of Aspect 29, wherein the trained FSOSR neural network classifier further includes one or more feature embedding networks as a learnable component.

Aspect 31: The apparatus of Aspect 30, wherein to determine the one or more distance metrics for each query sample, the at least one processor is configured to: determine an embedding for each query sample of the one or more query samples using the one or more feature embedding networks; determine the one or more prototype representations as an average embedding of a set of embeddings determined for the plurality of support samples associated with each class of the one or more classes; and determine each distance metric of the one or more distance metrics based on determining a Euclidean distance metric between the embedding determined for a given query sample and the embedding determined for each prototype representation of the one or more prototype representations associated with the one or more classes.

Aspect 32: The apparatus of any of Aspects 17 to 31, wherein the plurality of support samples are obtained for a single few-shot learning (FSL) episode and the task-agnostic open-set prototype representation is an episode-agnostic open-set prototype representation.

Aspect 33: A computer-readable storage medium storing instructions that, when executed by one or more processors, cause the one or more processors to perform operations according to any of Aspects 1 to 32.

Aspect 34: An apparatus for processing one or more data samples, comprising one or more means for performing operations according to any of Aspects 1 to 32.

What is claimed is:
1. A processor-implemented method for processing one or more data samples, comprising:
   determining one or more prototype representations based on a plurality of support samples associated with one or more classes of data samples, wherein each prototype representation is associated with one of the one or more classes;
   determining a task-agnostic open-set prototype representation, wherein the one or more prototype representa- tions and the task-agnostic open-set prototype representation are determined in a same learned metric space;

determining one or more distance metrics for each query sample of one or more query samples, wherein the one or more distance metrics are determined based on the one or more prototype representations and the task-agnostic open-set prototype representation; and classifying each query sample based on the one or more distance metrics, wherein each query sample is classified into one of the one or more classes associated with the one or more prototype representations or an open-set class associated with the task-agnostic open-set prototype representation.

2. The processor-implemented method of claim 1, wherein determining the one or more distance metrics for each query sample further comprises:

determining a Euclidean distance metric between a given query sample and each prototype representation of the one or more prototype representations associated with the one or more classes; and determining a Euclidean distance metric between the given query sample and the task-agnostic open-set prototype representation.

3. The processor-implemented method of claim 2, further comprising:

scaling the Euclidean distance metric between the given query sample and the task-agnostic open-set prototype representation using one or more learned scaling factors.

4. The processor-implemented method of claim 3, further comprising:

scaling the Euclidean distance metric between the given query sample and each prototype representation of the one or more prototype representations using the one or more learned scaling factors.

5. The processor-implemented method of claim 3, wherein:

the one or more learned scaling factors are determined as a first scalar value and a second scalar value; and the first scalar value and the second scalar value are learned based on a loss function that enforces the task-agnostic open-set prototype representation as a task-agnostic global-second-best classification for each query sample of the one or more query samples.

6. The processor-implemented method of claim 5, wherein:

the one or more learned scaling factors are task-agnostic scaling factors; and the task-agnostic open-set prototype representation is a global-second best classification for a plurality of few-shot open-shot recognition (FSOSR) episodes performed over the data samples.

7. The processor-implemented method of claim 1, wherein classifying each query sample based on the one or more distance metrics comprises:

determining a probability distribution over the one or more classes and the open-set class, wherein the probability distribution is determined based at least in part on a Euclidean distance metric determined between each query sample and a respective prototype associated with each class of the one or more classes and a Euclidean distance metric determined between each query sample and the task-agnostic open-set prototype representation; and classifying, based on the probability distribution, each query sample into one of the one or more classes or into the open-set class.

8. The processor-implemented method of claim 7, further comprising:

performing open-set rejection (OSR) based on a set of classified query samples classified into the open-set class associated with the task-agnostic open-set prototype representation.

9. The processor-implemented method of claim 7, wherein classifying each query sample based on the one or more distance metrics further comprises:

determining a probability that each query sample is included in the open-set class associated with the task-agnostic open-set prototype representation, based on the probability distribution; and comparing the determined probability to a pre-determined threshold.

10. The processor-implemented method of claim 9, further comprising:

classifying a given query sample as being included in the open-set class based on a determination that the probability the given query sample is included in the open-set class is greater than the pre-determined threshold; and classifying the given query sample as being included in a closed-set class based on a determination that the probability the given query sample is included in the open-set class is not greater than the pre-determined threshold.

11. The processor-implemented method of claim 10, further comprising:

classifying each query sample classified as being included in the closed-set class into a respective class of the one or more classes, wherein each query sample is classified based on maximizing a respective probability determined between each query sample and each respective class of the one or more classes.

12. The processor-implemented method of claim 11, wherein the probability is an argmax probability.

13. The processor-implemented method of claim 1, wherein classifying each query sample comprises:

providing each query sample to a trained few-shot open-shot recognition (FSOSR) neural network classifier, wherein the trained FSOSR neural network classifier includes at least the task-agnostic open-set prototype representation and one or more distance scaling factors as learnable components.

14. The processor-implemented method of claim 13, wherein the trained FSOSR neural network classifier further includes one or more feature embedding networks as a learnable component.

15. The processor-implemented method of claim 14, wherein determining the one or more distance metrics for each query sample further comprises:

determining an embedding for each query sample of the one or more query samples using the one or more feature embedding networks;

determining the one or more prototype representations as an average embedding of a set of embeddings determined for the plurality of support samples associated with each class of the one or more classes; and determining each distance metric of the one or more distance metrics based on determining a Euclidean distance metric between the embedding determined for a given query sample and the embedding determined for each prototype representation of the one or more prototype representations associated with the one or more classes.

16. An apparatus for processing one or more data samples, comprising:
 at least one memory; and
 at least one processor coupled to the at least one memory and configured to:
  determine one or more prototype representations based on a plurality of support samples associated with one or more classes of data samples, wherein each prototype representation is associated with one of the one or more classes;
  determine a task-agnostic open-set prototype representation, wherein the one or more prototype representations and the task-agnostic open-set prototype representation are determined in a same learned metric space;
  determine one or more distance metrics for each query sample of one or more query samples, wherein the one or more distance metrics are determined based on the one or more prototype representations and the task-agnostic open-set prototype representation; and
  classify each query sample based on the one or more distance metrics, wherein each query sample is classified into one of the one or more classes associated with the one or more prototype representations or an open-set class associated with the task-agnostic open-set prototype representation.

17. The apparatus of claim 16, wherein, to determine the one or more distance metrics for each query sample, the at least one processor is further configured to:
 determine a Euclidean distance metric between a given query sample and each prototype representation of the one or more prototype representations associated with the one or more classes; and
 determine a Euclidean distance metric between the given query sample and the task-agnostic open-set prototype representation.

18. The apparatus of claim 17, wherein the at least one processor is further configured to:
 scale the Euclidean distance metric between the given query sample and the task-agnostic open-set prototype representation using one or more learned scaling factors.

19. The apparatus of claim 18, wherein the at least one processor is further configured to:
 scale the Euclidean distance metric between the given query sample and each prototype representation of the one or more prototype representations using the one or more learned scaling factors.

20. The apparatus of claim 19, wherein:
 the one or more learned scaling factors are determined as a first scalar value and a second scalar value; and
 the first scalar value and the second scalar value are learned based on a loss function that enforces the task-agnostic open-set prototype representation as a task-agnostic global-second-best classification for each query sample of the one or more query samples.

21. The apparatus of claim 20, wherein:
 the one or more learned scaling factors are task-agnostic scaling factors; and
 the task-agnostic open-set prototype representation is a global-second best classification for a plurality of few-shot open-shot recognition (FSOSR) episodes performed over the data samples.

22. The apparatus of claim 16, wherein, to classify each query sample based on the one or more distance metrics, the at least one processor is configured to:
 determine a probability distribution over the one or more classes and the open-set class, wherein the probability distribution is determined based at least in part on a Euclidean distance metric determined between each query sample and a respective prototype associated with each class of the one or more classes and a Euclidean distance metric determined between each query sample and the task-agnostic open-set prototype representation; and
 classify, based on the probability distribution, each query sample into one of the one or more classes or into the open-set class.

23. The apparatus of claim 22, wherein the at least one processor is further configured to:
 perform open-set rejection (OSR) based on a set of classified query samples classified into the open-set class associated with the task-agnostic open-set prototype representation.

24. The apparatus of claim 22, wherein, to classify each query sample based on the one or more distance metrics, the at least one processor is further configured to:
 determine a probability that each query sample is included in the open-set class associated with the task-agnostic open-set prototype representation, based on the probability distribution; and
 compare the determined probability to a pre-determined threshold.

25. The apparatus of claim 24, wherein the at least one processor is further configured to:
 classify a given query sample as being included in the open-set class based on a determination that the probability the given query sample is included in the open-set class is greater than the pre-determined threshold; and
 classify the given query sample as being included in a closed-set class based on a determination that the probability the given query sample is included in the open-set class is not greater than the pre-determined threshold.

26. The apparatus of claim 25, wherein the at least one processor is further configured to: classify each query sample classified as being included in the closed-set class into a respective class of the one or more classes, wherein each query sample is classified based on maximizing a respective probability determined between each query sample and each respective class of the one or more classes.

27. The apparatus of claim 26, wherein the probability is an argmax probability.

28. The apparatus of claim 16, wherein, to classify each query sample, the at least one processor is configured to:
 provide each query sample to a trained few-shot open-shot recognition (FSOSR) neural network classifier, wherein the trained FSOSR neural network classifier includes at least the task-agnostic open-set prototype representation and one or more distance scaling factors as learnable components.

29. The apparatus of claim 28, wherein the trained FSOSR neural network classifier further includes one or more feature embedding networks as a learnable component.

30. The apparatus of claim 29, wherein, to determine the one or more distance metrics for each query sample, the at least one processor is configured to:

determine an embedding for each query sample of the one or more query samples using the one or more feature embedding networks;

determine the one or more prototype representations as an average embedding of a set of embeddings determined for the plurality of support samples associated with each class of the one or more classes; and determine each distance metric of the one or more distance metrics based on determining a Euclidean distance metric between the embedding determined for a given query sample and the embedding determined for each prototype representation of the one or more prototype representations associated with the one or more classes.

* * * * *